United States Patent [19]
Jensen

[11] 3,924,182
[45] Dec. 2, 1975

[54] SIGNAL ANALYZER
[75] Inventor: Garold K. Jensen, Alexandria, Va.
[73] Assignee: The United States of America as represented by the Secretary of the Navy, Washington, D.C.
[22] Filed: Jan. 30, 1967
[21] Appl. No.: 614,528

[52] U.S. Cl. ............ 324/77 R; 324/77 B; 324/78 R; 343/5 SA; 325/346
[51] Int. Cl.² .................. G01R 23/02; G01R 23/18
[58] Field of Search ............ 324/77, 78, 77 R, 77 B, 324/78 R; 343/5 SA

*Primary Examiner*—Maynard R. Wilbur
*Assistant Examiner*—G. E. Montone
*Attorney, Agent, or Firm*—R. S. Sciascia; Arthur L. Branning

[57] ABSTRACT

Apparatus for analyzing signals, such as radar transmissions, which indicates almost instantaneously, intra and inter pulse parameters, modulations and codings. FM wideband discriminator used to analyze most types of signals. For double sideband, suppressed carrier type of signals, detection stage is connected between a second receiver and a second FM wideband discriminator.

4 Claims, 2 Drawing Figures

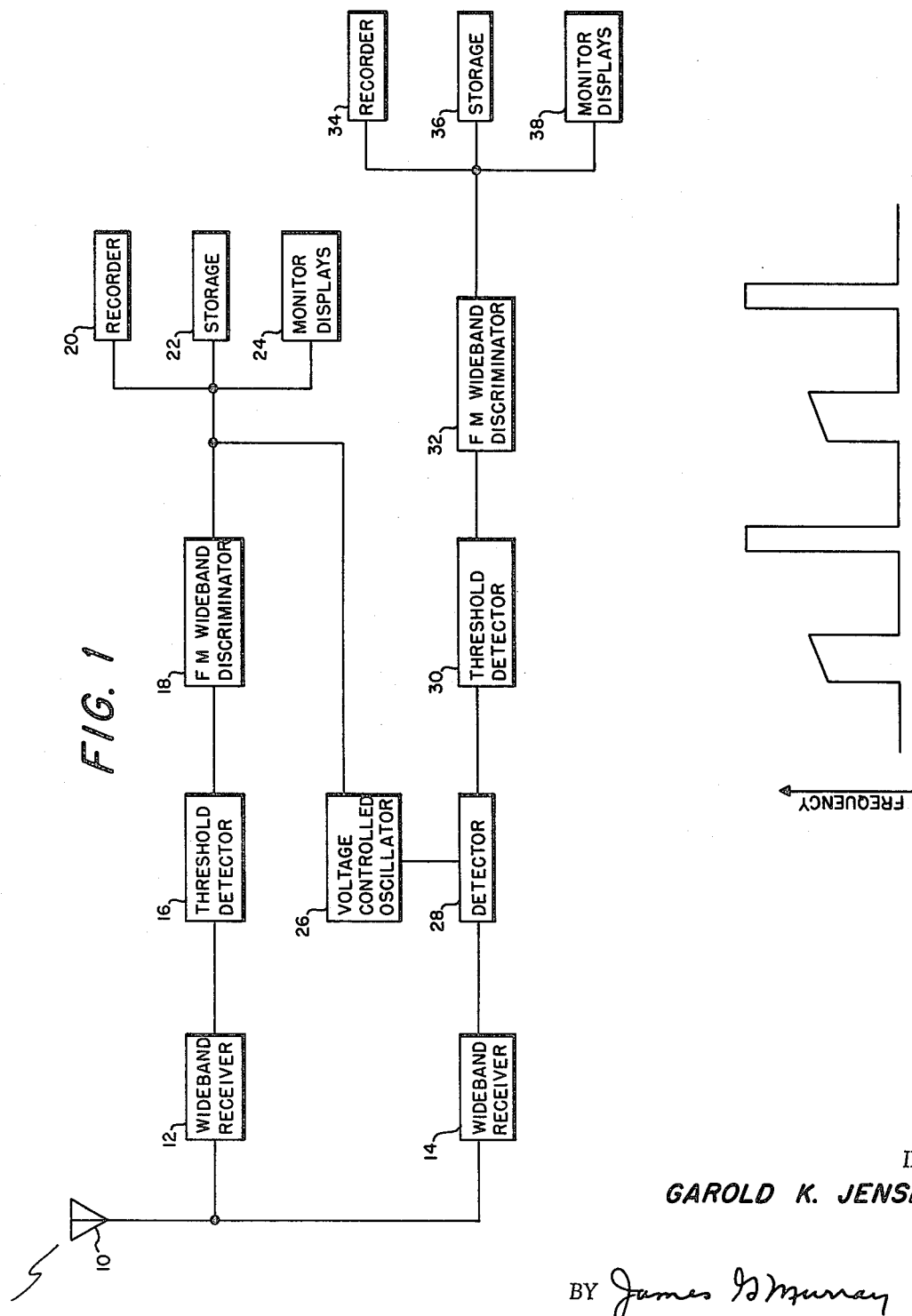

SIGNAL ANALYZER

The invention described herein may be manufactured and used by or for the Government of the United States of America for governmental purposes without the payment of any royalties thereon or therefor.

BACKGROUND OF THE INVENTION

1. Field of the Invention

This invention pertains to the analysis of signals, such as occur in radar transmission. The availability of such analysis, on an almost instantaneous basis, makes possible many new radar techniques.

2. Description of the Prior Art

The analysis of electronic signals has, prior to this invention, been performed with rather primitive means which have not given satisfactory results. Previously, reliance has largely been placed in frequency meters, such as the cycle counting type, and on comb filters. The prior analyzers, in comparison to the invention herein disclosed, are mechanically complex and are inherently incapable of matching the rapidity and scope of the information supplied by the present invention.

BRIEF SUMMARY OF THE INVENTION

The present invention relates to signal analyzers and more particularly to electronic circuitry which includes FM wideband discriminators and which rapidly furnishes information concerning the intra and inter pulse parameters, modulations and codings of radar transmissions.

It is therefore an object of the present invention to provide a signal analyzer which makes possible many new radar techniques.

A further object of the invention is to provide electronic circuitry which provides an analysis of most types of electronic signals, such as radar transmissions, by using wideband discriminators.

DESCRIPTION OF THE DRAWING

Other objects and features of the invention will become apparent to those skilled in the art as the disclosure is made in the following description of a preferred embodiment of the invention as illustrated in the accompanying drawings in which FIG. 1 illustrates the invention in block diagram form and FIG. 2 is a diagram which is useful in explaining the operation of the invention.

DESCRIPTION OF THE PREFERRED EMBODIMENT

Referring now to FIG. 1, an incoming signal which it is desired to analyze, is received by antenna 10 that is connected to receivers 12 and 14. These receivers are suitable to receive signals over a wide frequency band that includes the frequency extremes of the incoming signal. Of course, as an obvious variation, a plurality of receivers connected in paralled, and each covering a different frequency sub-band, may be used in place of the receivers 12 and 14.

The output of receiver 12, which is herein described as being r-f but which obviously could be converted to i-f by conventional heterodyning, is connected to a threshold detector 16 which is conventional in nature and functions to block signals (noise) below a certain threshold level and to pass the signals above such a threshold level. Consequentially it will be realized that the signals to be analyzed must be stronger than the threshold level.

Detector 16 is in turn connected to a FM wideband discriminator 18 that functions, in an entirely conventional manner, to produce an output signal which is a varying d-c voltage related in amplitude to the frequency of the signal received from detector 16. The discriminator output signal is connected to recorder 20, to a storage device 22 from which the discriminator signal can be played back as desired, and to display devices 24 which provide a monitoring arrangement for the operating personnel.

The invention, to the extent already described, will provide data, in the devices 20, 22 and 24, that is readily adaptable to the analysis of most types of signals which are received by the antenna 10.

For example, FIG. 2 is representative of a portion of the record provided by conventional device 20 which records the input signal from discriminator 18 on a tape moving at constant speed. The height of the recorder signal is related to the frequency of the incoming signal received by antenna 10. The width and spacing of the elevated portions of the record are related to the pulse duration and pulse repetition frequency of the incoming signal. It will be apparent that the record also provides an indication of frequency modulations (as by the slanted tops of the alternate pulses in FIG. 2), codings, etc.

The invention, as so far described, is not effective if the incoming signal received by antenna 10 is of the type which has a suppressed carrier and widely separated upper and lower sidebands since the output of the discriminator 18 will be representative of the average (suppressed carrier) frequency.

To analyze signals of the suppressed carrier type, the invention further provides a voltage controlled oscillator 26 connected to the output of discriminator 18. The output of oscillator 26, which has a frequency equal to the average of the incoming sideband signals, is connected to detector 28, ordinarily considered a part of the receiver 14 but shown separately in FIG. 1 for convenience of description. In detector 28 the signals from antenna 10 and oscillator 26 are combined by the familiar heterodyning process. The output of detector 28 contains a signal equal to the frequency separation of the sideband signals from the suppressed carrier frequency. In some instances it may be desirable to have phase correlation between the received sideband signals and the output of detector 28. Obviously this can be accomplished by using any one of many well known synchronous detectors as the detector 28. The output signal of detector 28 is connected to be processed by threshold detector 30, FM wideband discriminator 32, recorder 34, storage device 36 and display devices 38 which function in a manner similar to the previously described operation of components 16, 18 20, 22 and 24.

The operation of the invention is by now probably apparent. During periods when no incoming signal is received by antenna 10 the operating personnel will observe no display signals on monitoring devices 24 and 38 and no signals will be recorded or stored by the devices 20, 22, 34 and 36. If a pulsed or c-w carrier signal is received by antenna 10, the monitoring device 24 will display an indication of the received signal and alert the operating personnel who will then be able to obtain desired analytic information from the components 20 and 22. In the event the incoming signal is of the type which has a suppressed carrier and widely separated upper and lower sidebands, alerting signals will appear on both of the monitors 24 and 38, thereby informing the operating personnel that the signal analysis must be performed by using the information in both the devices 20, 22 (which will provide data as to the carrier) and the devices 34, 36 (which will provide data as to the sidebands).

There has been disclosed an electronic circuit which is useful in the analysis of most types of transmissions by utilizing a FM wideband discriminator. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the U.S. is:

1. An signal analyzer comprising:
   a signal source producing a signal to be analyzed;
   first analyzing means connected to said signal source and including a first FM wideband discriminator for analyzing said signal to be analyzed;
   a voltage controlled oscillator connected to be controlled by said first FM wideband discriminator and producing an oscillator signal and
   second analyzing means connected to said signal source and to said voltage controlled oscillator and including a second FM wideband discriminator for combining and for analyzing the combination of said oscillator signal and said signal to be analyzed whereby said first analyzing means produces analytic data related to said signal to be analyzed and said second analyzing means produces analytic data related to the sideband components, if any, of said signal to be analyzed.

2. A signal analyzer as set forth in claim 1 wherein said first analyzing means comprises a series circuit including a first wideband receiver, a first threshold detector, said first FM wideband discriminator and first recording, storage and monitoring display devices.

3. A signal analyzer as set forth in claim 2 wherein said second analyzing means comprises a series circuit including a second wideband receiver, a detector, a second threshold detector, said second FM wideband discriminator and second recording, storage and monitoring display devices.

4. A signal analyzer comprising:
   a signal source producing a signal to be analyzed;
   a first series circuit connected to said signal source and including a receiver, threshold detector, discriminator and indicator;
   a second series circuit connected to said signal source and including a receiver, detector, threshold detector, discriminator and indicator and
   a voltage controlled oscillator connected to be controlled by the discriminator in said first series circuit and connected as an input to the detector of said second series circuit.

* * * * *